United States Patent [19]
Carlander

[11] Patent Number: 4,738,107
[45] Date of Patent: Apr. 19, 1988

[54] DEVICE IN AN ACTUATOR FOR ELEVATION ADJUSTMENT OF WORK STATIONS

[76] Inventor: Lars E. Carlander, Alingsåsvägen 20, S-510 41 Sjömarken, Sweden

[21] Appl. No.: 691,529
[22] PCT Filed: Apr. 24, 1984
[86] PCT No.: PCT/SE84/00152
§ 371 Date: Dec. 21, 1984
§ 102(e) Date: Dec. 21, 1984
[87] PCT Pub. No.: WO84/04234
PCT Pub. Date: Nov. 8, 1984

[30] Foreign Application Priority Data

Apr. 22, 1983 [SE] Sweden ............ 8302265

[51] Int. Cl.[4] ............ F15B 7/08; B60T 7/02
[52] U.S. Cl. ............ 60/534; 60/581; 60/594; 92/13.6; 92/33; 417/374; 74/89.15; 74/665 GD
[58] Field of Search ............ 92/5 R, 13.6, 31, 33, 92/59, 85 B, 88, 143, 147, 165 R; 60/581, 594, 534; 417/374, 415; 74/89.15, 665 GD, 583, 424.8 R

[56] References Cited

U.S. PATENT DOCUMENTS

| | | | |
|---|---|---|---|
| 651,864 | 6/1900 | Kelly | 982/88 X |
| 1,137,455 | 4/1915 | Bowser | 92/5 R X |
| 1,243,750 | 10/1917 | Miller | 108/147 |
| 1,777,293 | 10/1930 | Curtis et al. | 92/5 R X |
| 1,783,359 | 12/1930 | Floyd | 92/33 X |
| 1,797,809 | 3/1931 | Turrettini | 74/424.8 R X |
| 1,820,362 | 8/1931 | Monn et al. | 60/581 X |
| 2,955,574 | 10/1960 | Geyer | 92/33 X |
| 2,970,442 | 2/1961 | Taylor | 92/31 X |
| 3,190,146 | 6/1965 | Sorensen et al. | 74/89.15 X |
| 3,249,019 | 5/1966 | Seeloff | 92/13.6 X |
| 3,583,287 | 6/1971 | Rieschel | 92/31 X |
| 3,745,840 | 7/1973 | Guralnick | 74/89.15 |
| 3,771,421 | 11/1973 | Scheffer | 92/13.6 X |
| 3,943,868 | 3/1976 | Person et al. | 92/143 X |
| 3,979,999 | 9/1976 | Emenaker | 92/33 X |

FOREIGN PATENT DOCUMENTS

| | | | |
|---|---|---|---|
| 2758745 | 7/1979 | Fed. Rep. of Germany | 417/374 |
| 7907974-5 | 3/1981 | Sweden . | |

*Primary Examiner*—Robert E. Garrett
*Assistant Examiner*—George Kapsalas
*Attorney, Agent, or Firm*—Cushman, Darby & Cushman

[57] ABSTRACT

An actuator for variable adjustment of the pistons in hydraulic slave cylinders for regulation of for example the elevation adjustment of work stations. The pistons are actuated by way of a pusher which is non-rotatable but axially displaceable in the actuator housing (10). In the housing (10) there are provided one or more oblong openings (22) for drivers (27) attachable to the pusher and arranged for cooperation with the corresponding pusher in one or several further actuators placeable close to the actuator and that in at least one of the connected actuators there is arranged a threaded spindle for cooperation with a pusher designed as a nut.

9 Claims, 2 Drawing Sheets

DEVICE IN AN ACTUATOR FOR ELEVATION ADJUSTMENT OF WORK STATIONS

BACKGROUND OF THE INVENTION

1. Field of the Invention

The present invention relates to a device in an actuator for variable adjustment of the pistons of hydraulic slave cylinders for regulation of for example the elevation adjustment of work stations, at which the pistons are actuated by way of a pusher which is non-rotatable but axially displaceable in the actuator housing.

2. Brief Description of the Prior Art

Hydraulic actuators, by which a work station for example a work-bench, a terminal table, sickbed or the like can be raised or lowered for matching to individual requirements, are previously known. In the Swedish Pat. No. 7907974-5 a similar actuator is described with which a number of, for example, four, hydraulic cylinders at the same time can be actuated by means of a hand crank or engine in order to adjust the height of the work station. The actuator in question is made of a pump or a driving unit to which four leg cylinders, that is piston cylinders, are connected by way of flexible tubes, and which are applied in for example a table leg, and by which the table can be raised or lowered. By moving the pistons in the pump unit the pistons in the leg cylinders will be modified on the corresponding way so that the desirable height adjustment is provided. A pump unit for four or several legs is a relatively bulky device, which is often mounted under the table top, where it is easily accessible from the work station. This location results however that the space for the legs under the table is reduced, which is of course a disadvantage. Further for every change in the number of the legs which should be raised or lowered, there must be a special variant, which causes both manufacturing, stock keeping and sevice problems.

Occasionally, an existing system, for example a terminal table, must have an additional side table must have connected and the system must then be completed. With the equipment available today, this is only possible by replacing the old device by new one, which is costly.

The elevation adjustment device for a work station must also be so designed that a heavy uneven loading of the work station will not cause any damage or breakdown the actuator.

SUMMARY OF THE INVENTION

The object of the present invention is to provide an actuator which demands low installation height, which can be adapted to if not an unlimited number, so however a great number of pump cylinders without influencing the low installation height.

Another object of the invention is to preserve or to improve the adjustment possibility which the actuator must have in order to be able to adjust every individual cylinder in the respective table leg for balancing of any possible irregularities in the floor, to local elevations or the like. Thus the hydraulic system should be readjusted, as it is unavoidable to hold all the slave and leg cylinders on an exact synchronous adjustment for many years. Another object is that it should be easy to complete an earlier installed system with more actuators. These problems have been solved by the fact that in the housing there are provided one or more oblong openings for drivers attachable to the pusher and arranged for cooperation with the corresponding pusher in one or several further actuators placeable close to the actuator and that in at least one of the connected actuators there is arranged a threaded spindle for cooperation with a pusher designed as a nut.

DESCRIPTION OF THE PREFERRED EMBODIMENTS

Figure 1:
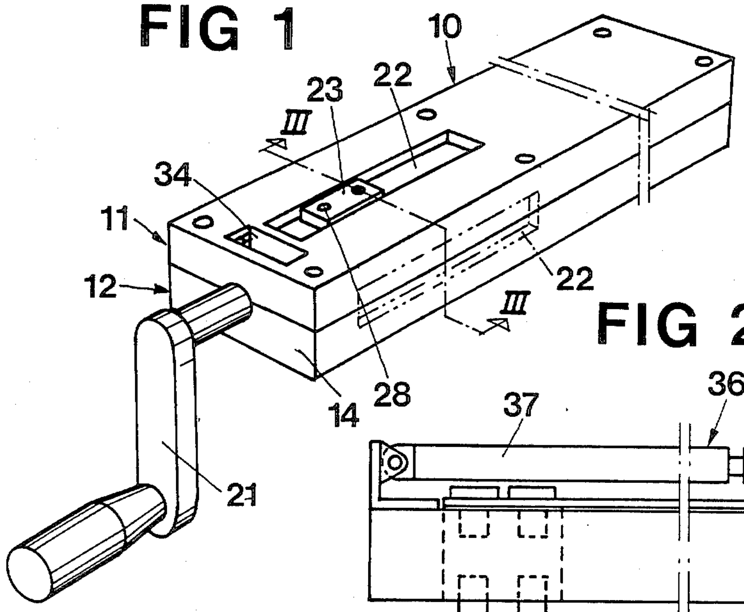
FIG. 1 shows in perspective an actuator designed as a basic unit according the invention.
Figure 3:
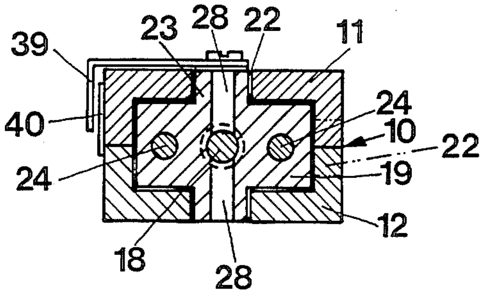
FIG. 3 is a cross section according to the line III—III in FIG. 1.
Figure 4:
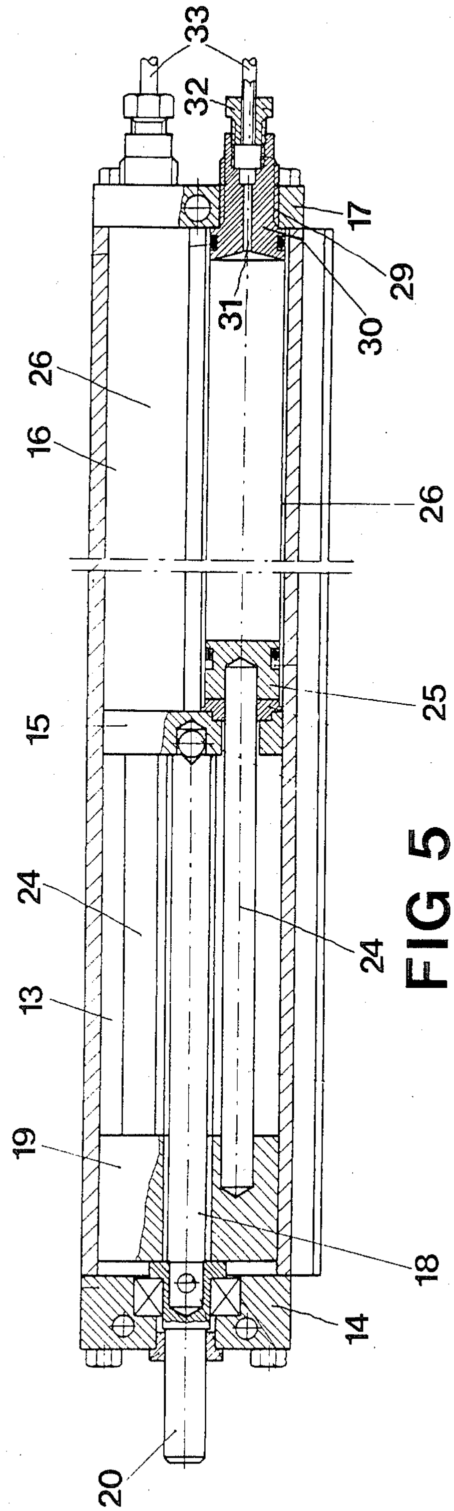
FIG. 4 shows a longitudinal section through the basic unit according FIG. 1.
Figure 5:
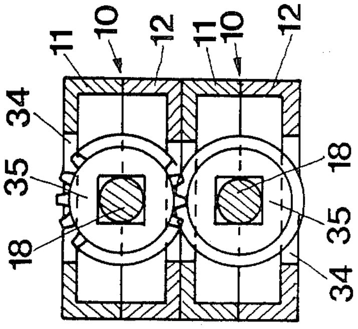
FIG. 5 shows a cross section through the front part of a modified basic unit according the invention.

As it is illustrated in FIGS. 1, 3 and 4 the actuator designed as a basic unit consists of two identical housing halves 11,12 divided into two sections, a first 13, which is limited by a first outer gable wall 14 and a partition 15 and a second section 16 on the other side of the partition 15 and which outwards is limited by another gable wall 17.

The first section 13 comprises a self-braking threaded spindle 18 which is mounted in both the gable wall 14 and the partition 15, and which cooperates with a nut-shaped pusher 19. Outside the gable-wall 14 an elongation of the spindle in the form of a pin 20 is arranged, which by means of a hand crank 21 or an engine (not shown) can rotate the spindle and by that displace the pusher in the housing 10. In the housing 10 there are arranged oblong openings 22 in which elongated portions 23 of the pusher 19 extend. The portions 23 are guided by the openings 22. The pusher consists preferably of a material with a low coefficient of friction and is so designed that it with little play suits into the interior of the housing having a rectangular cross-section.

To the pusher 19 there are connected two axles 24, which extend through the partition 15 and which provide piston rods for pistons 25, which pistons are displaceable in hydraulic cylinder 26. On each of the portions 23 of the pusher 19 extending into the openings 22 there are arranged one or several drivers 27, which preferably consist of short shaft pivots insertable into bores 28 arranged in the pusher 19.

In the second gable wall 17 of the housing there are arranged threaded holes located axially in front of the hydraulic cylinder, and through which extends an extension of the piston-shaped end termination 30 of the cylinder provided with corresponding threads. This is so designed that by being rotated it is displaced in the cylinder 26 and can thus occupy different displaced positions, so that an adjustment of the volume of the cylinder can be provided. In the end termination 30 of the cylinder 36 there is also arranged a passage 31 for the oil and an inlet plug 32 for a hydraulic tubing 33.

The actuator is manufactured in two variants i.e. a basic unit, as it is shown in FIGS. 1, 3, and 4, and a slave unit, which compared with the basic unit does not have the threaded spindle 18 and supporting members for the latter and the driving pin 20. Instead of locating the basic unit between two slave units it is also possible to arrange the basic unit farthest out with several slave units in series after each other, connected to one side of the basic unit. If an extreme low installation height is desired, the oblong openings 22 might be arranged on the narrow side of the housing instead of in its wide side, as is indicated with dot and dash lines in FIG. 1. Possibly both of the openings 22 can be provided in the housing. This is preferably manufactured die cast for example of aluminium in two halves, as it is shown in FIG. 1.

In such cases where a double acting cylinder is desired or where the actuator as standard basic unit is exposed to very irregular loading which can not be taken up by the basic unit a through opening 34 is provided in the housing 10 close to the first gable 14. The screw spindle 18 is in front of said opening 34 designed with a non-round cross section, so that a gear wheel 35 can be unrotatably fixed to the spindle 18. The gear wheel 35 is so designed that two similar basic units can be coupled together, so that the gear wheels will mesh with each other. The same driving source can by that drive two or several basic units. The connection makes the pistons in both actuators work against each other, by which the powers can be balanced against each other. If both actuators should have a co-ordinated rectified piston motion of the screw spindle 18 of the one actuator is designed with left and the other with right threads. Also in this design the pushers in both basic units are connected with each other. Besides it is of course possible to connect slave units.

Figure 2:
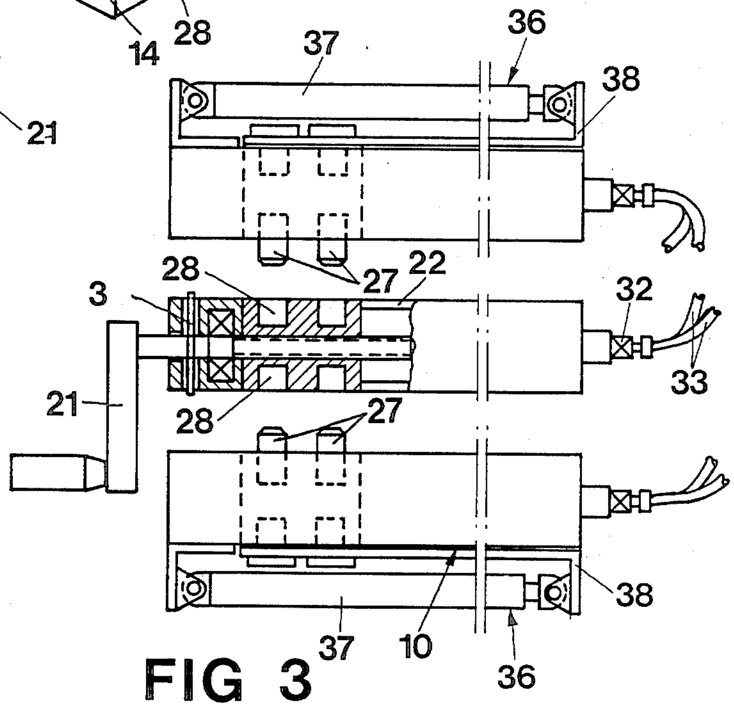
FIG. 2 shows a view from above three actuators in a position for being connected with each other.

If the liftable part of the work station has a considerable weight or will be loaded with heavy weight it can be appropriate to balance the weights by means of a balancing device 36. This can for example consist of a gas spring 37, one end of which is firmly connected to the housing 10, for example near the housing gable 14, while the opposite end via a bracket 38 is fastened to the pusher 19. It could be suitable to provide such balancing devices 36 at both free outer sides of an actuator package as is shown in FIG. 2.

The pusher 19 can also be used as an attachment for an indicator 39 which against a scale 40 indicates the position of the pusher and by that also the position of the pistons in the actuator. Since their position corresponds to the elevation of the work station with the respective leg this indicating and scale can be used for an exact adjustment of the height position of the work station.

The invention is not limited to the illustrated and described embodiments but a plurality of variants are possible within the scope of the claims.

I claim:

1. Hydraulic actuating apparatus for the variable adjustment of pistons in slave cylinders for regulation of the elevation adjustment of fluid operable supports, such as legs for vertically adjustable tables, benches, beds and the like, comprising:

at least two actuators placed close together, each including a housing, at least one hydraulic cylinder and piston unit and a pusher for moving said piston, each of said hydraulic cylinder and piston units being operable connected to one of said fluid operable supports, each pusher being nonrotatable but axially displaceable in the respective housing;

each housing having at least one elongated opening therein extending in the direction of movement of the respective pusher and exposing a portion of the respective pusher;

at least one driver connected between the exposed portion of the pusher in another housing so as to transmit driving forces from one pusher to another, wherein at least one of the pushers includes a threaded nut; and wherein at least one of the actuators includes a threaded spindle cooperating with the pusher of the actuator wherein rotation of the spindle moves the respective pusher and whereupon the corresponding movement of the pusher in another actuator is effected.

2. Apparatus as in claim 1 wherein the actuator housings have rectangular cross sections and wherein there are two of said piston and cylinders units arranged close to each other and parallel to each other in each housing.

3. Apparatus as in claim 10 wherein said openings are in the wide sides of the housings.

4. Apparatus as in claim 10 wherein said openings are in the narrow sides of the housings.

5. Apparatus as in claim 1 wherein the pushers have portions extending into said openings in the housings whereby movement of the pushers is guided.

6. Apparatus as in claim 1 wherein two adjacent actuators have screw spindles fitted with gear wheels each of which has a peripheral portion extending into a recess in the respective actuator housing, the gear wheels being in meshing engagement with each other.

7. Apparatus as in claim 1 including a balancing device in the form of a gas spring or the like connected between at least one of the pushers and the respective housing, the balancing device having a restoring force acting on the pusher in the load-carrying displacement direction thereof.

8. Apparatus as in claim 1 including an indicator connected to at least one of the pushers for indicating the position of that pusher, whereby the height of a work station can be indicated.

9. Apparatus as in claim 1 wherein at least one of the actuator housings has an end wall which has an opening therein, there being fitted in said opening a piston which can be fixed to said end wall in different displaced positions in said opening, said piston serving as an end termination of the cylinder in the respective housing.

* * * * *